(12) United States Patent
An et al.

(10) Patent No.: US 11,855,269 B2
(45) Date of Patent: Dec. 26, 2023

(54) BATTERY MODULE

(71) Applicant: SK On Co., Ltd., Seoul (KR)

(72) Inventors: Sun Mo An, Daejeon (KR); Ji Eun Kang, Daejeon (KR); Sang Hyun Lee, Daejeon (KR); Hae Ryong Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 113 days.

(21) Appl. No.: 17/463,843

(22) Filed: Sep. 1, 2021

(65) Prior Publication Data

US 2022/0077519 A1 Mar. 10, 2022

(30) Foreign Application Priority Data

Sep. 4, 2020 (KR) .................. 10-2020-0112905

(51) Int. Cl.
*H01M 10/653* (2014.01)
*H01M 50/505* (2021.01)
*H01M 10/613* (2014.01)

(52) U.S. Cl.
CPC ....... *H01M 10/653* (2015.04); *H01M 10/613* (2015.04); *H01M 50/505* (2021.01)

(58) Field of Classification Search
CPC ............ H01M 10/653; H01M 10/613; H01M 50/505; H01M 10/647; H01M 10/6554; H01M 10/6556; H01M 50/211; H01M 50/503; H01M 10/6555; H01M 50/204; H01M 50/507; H01M 10/6553; H01M 50/502; Y02E 60/10; Y02E 10/50; Y02E 10/547; Y02E 10/52; Y02E 60/50; Y02E 10/548; Y02E 10/549; Y02E 10/542; Y02E 10/546; Y02E 40/60; Y02E 60/13; Y02E 70/30; Y02E 10/541; Y02E 20/16; Y02E 20/18; Y02E 10/544; Y02E 60/36; Y02E 10/47; Y02E 30/10; H01L 27/1225; H01L 29/7869; H01L 27/124; H01L 29/78648; H01L 29/78696; H01L 27/1255; H01L 27/1214; H01L 29/66969; H01L 31/022425; H01L 29/24; H01L 29/78693; H01L 27/0266; H01L 29/4908;
(Continued)

(56) References Cited

U.S. PATENT DOCUMENTS 10,497,910 B2    12/2019 Lee et al.
10,673,050 B2 *   6/2020 Mack .................. H01M 50/566
(Continued)

FOREIGN PATENT DOCUMENTS

JP    2001229897 A  *  8/2001  ............. Y02E 60/10
JP    2018503233 A  *  2/2018  ............ H01M 10/625
(Continued)

*Primary Examiner* — Kaity V Chandler
(74) *Attorney, Agent, or Firm* — THE WEBB LAW FIRM

(57) ABSTRACT

A battery module includes a battery cell stack in which a plurality of battery cells are stacked; a module case for accommodating the battery cell stack therein; and a bus bar assembly disposed between the module case and the battery cell stack and electrically connected to the battery cells. The bus bar assembly may include at least one bus bar and a thermal conduction unit for embedding the bus bar therein. The thermal conduction unit may be formed of a resin material containing a thermally conductive filler.

9 Claims, 4 Drawing Sheets

(58) Field of Classification Search
CPC ........... H01L 27/1248; H01L 29/78606; H01L 27/156; H01L 29/786; H01L 29/42384; H01L 21/02565
See application file for complete search history.

(56) References Cited

U.S. PATENT DOCUMENTS

| | | | |
|---|---|---|---|
| 2018/0114960 A1* | 4/2018 | Sato | .................... H01M 50/209 |
| 2018/0159096 A1 | 6/2018 | Kim et al. | |
| 2020/0013573 A1 | 1/2020 | Won et al. | |
| 2020/0185682 A1* | 6/2020 | Kim | .................... H01M 50/531 |
| 2022/0102798 A1* | 3/2022 | Son | .................... H01M 50/1245 |

FOREIGN PATENT DOCUMENTS

| | | | | | |
|---|---|---|---|---|---|
| KR | 20140065582 | A | * | 5/2014 | ............. Y02E 60/10 |
| KR | 20140145250 | A | * | 12/2014 | .......... H01M 10/613 |
| KR | 101806997 | B1 | | 12/2017 | |
| KR | 101990394 | B1 | | 6/2019 | |
| KR | 102056875 | B1 | | 12/2019 | |
| WO | WO-2007121445 | A2 | * | 10/2007 | ........ H01M 10/0436 |
| WO | WO-2014024448 | A1 | * | 2/2014 | .......... H01M 2/1077 |
| WO | WO-2020059124 | A1 | * | 3/2020 | .......... H01M 50/548 |

\* cited by examiner

BATTERY MODULE

CROSS-REFERENCE TO RELATED APPLICATION

This application claims priority to Korean Patent Application No. 10-2020-0112905 filed Sep. 4, 2020, the disclosure of which is hereby incorporated by reference in its entirety.

BACKGROUND OF THE INVENTION

1. Field of the Invention

The present disclosure relates to a battery module.

2. Description of Related Art

Secondary batteries, unlike primary batteries, can be charged and discharged, and thus, secondary batteries can be applied to devices within various fields, such as digital cameras, cell phones, laptops, and hybrid vehicles. Such secondary batteries may include, for example, a nickel-cadmium battery, a nickel-metal hydride battery, a nickel-hydrogen battery, a lithium secondary battery, and the like.

Among these secondary batteries, many studies have been conducted into lithium secondary batteries having high energy density and discharge voltage. Recently, lithium secondary batteries have been manufactured as pouch-type battery cells with flexibility to be configured and used in the form of a module through the connection of a plurality of pieces.

However, as energy density of the battery module increases, there is a problem in that a temperature of the bus bar disposed inside the battery module is excessively increased.

Therefore, there is a demand for a battery module capable of effectively lowering the heat of the busbar.

SUMMARY OF THE INVENTION

An aspect of the present disclosure is to provide a battery module capable of effectively lowering heat generated in a bus bar.

According to an embodiment of the present disclosure, a battery module includes: a battery cell stack in which a plurality of battery cells are stacked; a module case for accommodating the battery cell stack therein; and a bus bar assembly disposed between the module case and the battery cell stack and electrically connected to the battery cells, wherein the bus bar assembly includes at least one bus bar and a thermal conduction unit for embedding the bus bar therein, wherein the thermal conduction unit is formed of a resin material containing a thermally conductive filler.

In the present embodiment, the bus bar assembly may be disposed such that at least a portion thereof is in contact with the module case.

In the present embodiment, the thermally conductive filler may include at least one selected from a group consisting of boron nitride, aluminum nitride, silicon carbide, magnesium oxide, and aluminum oxide.

In the present embodiment, the thermal conduction unit may be formed of a material having thermal conductivity of 2 W/mK or more.

In the present embodiment, the thermal conduction unit may have volume resistivity of $1\times10^{10}$ $\Omega$·cm or more, in an environment of 500V voltage and 60 seconds.

In the present embodiment, the thermal conduction unit may have surface resistance of $1\times10^{12}$ $\Omega$·cm or more, in an environment of 500V voltage and 60 seconds.

In the present embodiment, in the bus bar assembly, at least half of the bus bar may be embedded in the thermal conduction unit.

In this embodiment, a cooling device coupled to an outer surface of the case may be further included.

In the present embodiment, the cooling device may include a cooling passage therein.

According to another embodiment of the present disclosure, a battery module includes: a battery cell stack in which a plurality of battery cells are stacked; a module case for accommodating the battery cell stack therein; and a bus bar assembly disposed between the module case and the battery cell stack and electrically connected to the battery cells, wherein the bus bar assembly includes a bus bar having a plurality of through slits to which electrode leads of the battery cells are coupled; and a thermal conduction unit for embedding the bus bar therein, wherein the bus bar is configured such that a region between the through slits are embedded in the thermal conduction unit.

In this embodiment, the thermal conduction unit thermal conduction unit may be formed of a resin material containing a thermally conductive filler.

In the present embodiment, in the bus bar assembly, at least half of the bus bar may be embedded in the thermal conduction unit.

BRIEF DESCRIPTION OF THE DRAWINGS

The above and other aspects, features and other advantages of the present disclosure will be more clearly understood from the following detailed description taken in conjunction with the accompanying drawings, in which.

DESCRIPTION OF THE INVENTION

Figure 1:
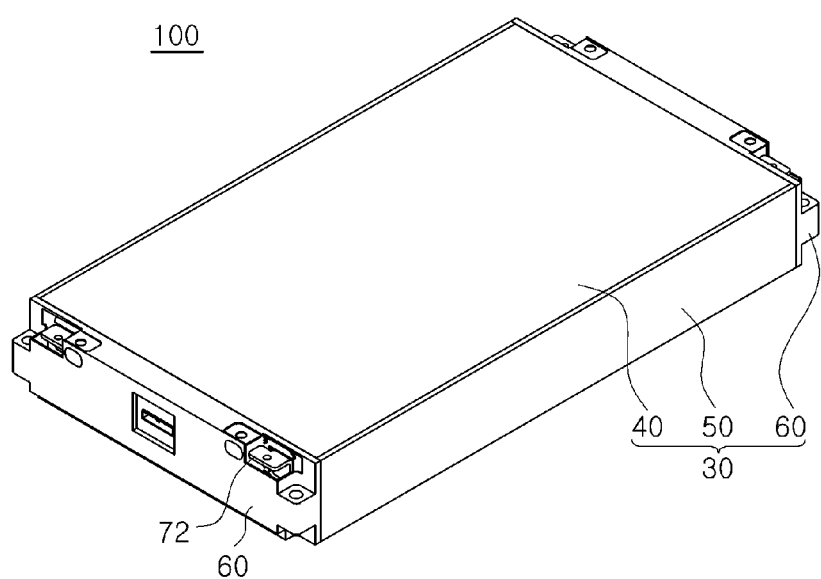
FIG. 1 is a perspective view schematically illustrating a battery cell according to an embodiment of the present disclosure.

Prior the detailed description of the present disclosure, the terms or words in the present specification and claims should not constructed as limited to ordinary or dictionary meanings, and it should be construed as meaning and concept consistent with the technical idea of the present disclosure based on the principle that it can be properly defined as a concept of a term in order to explain the present disclosure in the best way. Therefore, the embodiments described in the present specification and the configurations shown in the drawings are merely the most preferred embodiments of the present disclosure, and are not intended to represent all of the technical ideas of the present disclosure. It should be understood that various equivalents and modifications may be substituted for them at the time of filing of the present application.

Hereinafter, exemplary embodiments of the present disclosure will be described in detail with reference to the accompanying drawings. Further, the detailed description of known functions and constructions that may obscure the gist of the present invention will be omitted. For the same reason, some of the elements in the accompanying drawings are exaggerated, omitted, or schematically shown, and the size of each element does not entirely reflect the actual size.

For example, in the present specification, terms "upper side", "lower side", "side surface", and the like, are represented based on the drawings and may be differently represented when directions of corresponding targets are changed.

Figure 2:
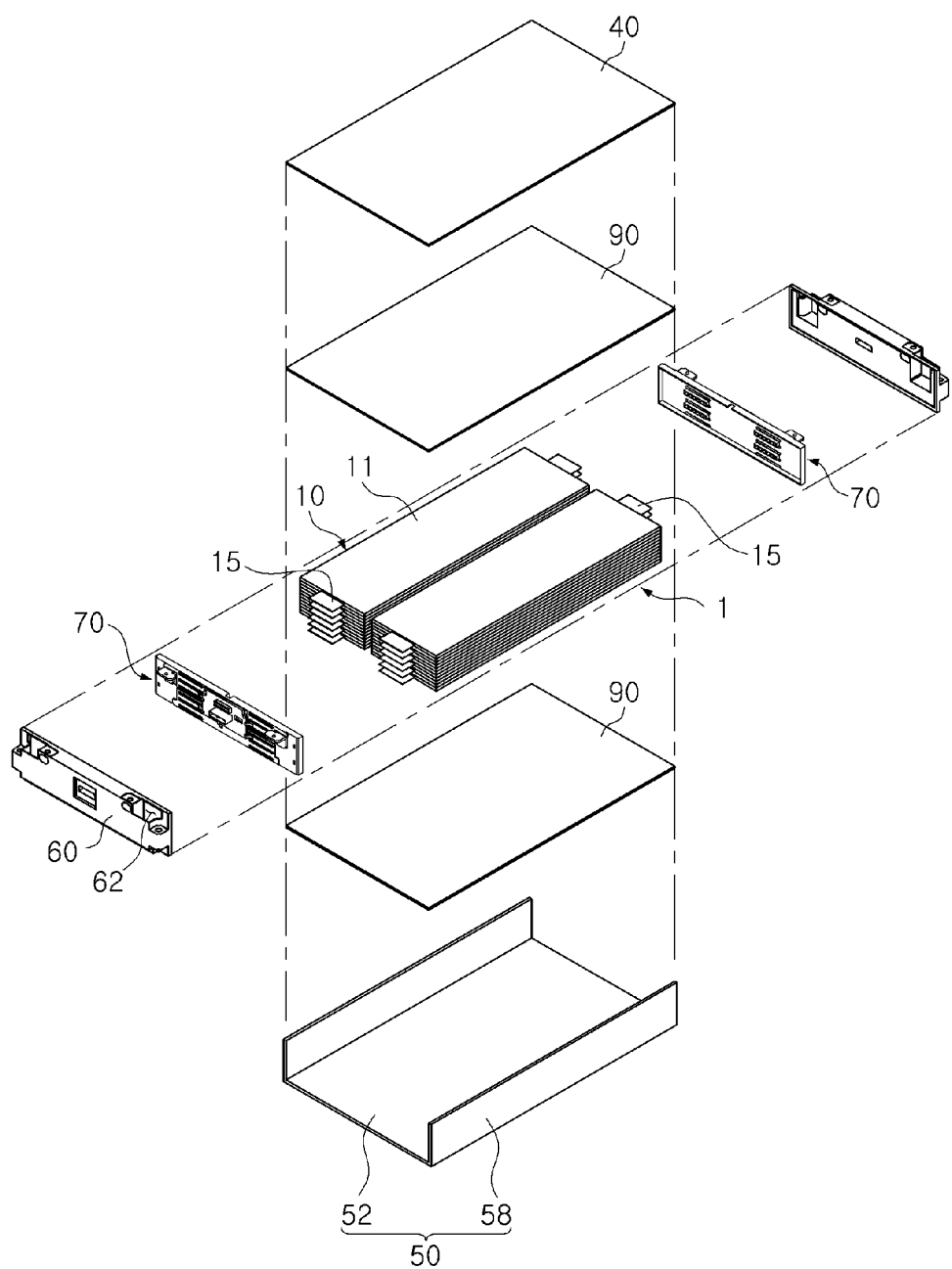
FIG. 2 is an exploded perspective view of FIG. 1.

FIG. 1 is a perspective view schematically illustrating a battery cell according to an embodiment of the present disclosure, and FIG. 2 is an exploded perspective view of FIG. 1.

Referring to FIGS. 1 to 2, a battery module 100 of the present embodiment may include a battery cell stack 1 in which a plurality of battery cells 10 are stacked, a module case 30, and a bus bar assembly 70.

The battery cell stack 1 may be formed by stacking the battery cells 10 in an up-down direction (or a vertical direction). However, it is also possible to configure so as to be stacked in a left-right direction as necessary.

Each of the battery cells 10 may be a pouch-type secondary battery, and may have a structure in which an electrode lead 15 protrudes externally.

The battery cell 10 may be configured in a form in which an electrode assembly (not shown) is accommodated in a pouch 11.

The electrode assembly includes a plurality of electrode plates and electrode tabs and is accommodated in the pouch 11. The electrode plate may be formed by alternately stacking a plurality of positive electrode plates and a plurality of negative electrode plates. In this case, each of the plurality of positive electrode plates and the plurality of negative electrode plates may be provided with electrode tabs, and may be connected to the same electrode lead 15 by contacting the same polarities.

Each of the battery cells 10 of the present embodiment may be disposed such that the two electrode leads 15 face each other in opposite directions.

The pouch 11 is formed in a form of a container to provide an internal space in which an electrode assembly and an electrolyte (not shown) are accommodated. In this case, a portion of the electrode lead 15 of the electrode assembly is exposed to the outside of the pouch 11.

Meanwhile, although not shown, at least one buffer pad may be disposed between the stacked battery cells 10.

The buffer pad may be provided to suppress expansion of a volume of entire battery cells when a specific battery cell expands. The buffer pad may be formed of a polyurethane material, but is not limited thereto.

When the buffer pad is made of an adhesive material, the battery cells 10 may be bonded to each other by the buffer pad to constitute the battery cell stack 1. However, the present disclosure is not limited thereto, and a separate fixing member may be added to fix the stacked battery cells 10.

The battery cell 10 configured as described above may be a nickel metal hydride (Ni-MH) battery or a lithium ion (Li-ion) battery capable of charging and discharging.

A module case 30 defines an external appearance of the battery module 100, and may be disposed outside of the plurality of battery cells 10 to protect the battery cells 10 from an external environment.

The module case 30 of the present embodiment may include a first plate 50 disposed on one side of the battery cell stack 1, a second plate 40 disposed on the other side of the battery cell stack 1, and a cover 60 disposed on a side surface on which the electrode leads 15 of the battery cells 10 are disposed. Thereamong, the first plate 50 and the second plate 40 may function as a cooling member of the battery module 100.

The first plate 50 may include a lower plate 52 disposed below the battery cell stack 1 to support a lower surface of the battery cell stack 1, and a side surface plate 58 supporting a side surface of the battery cell stack 1.

In the present embodiment, the lower plate 52 and the side surface plate 58 may be formed by bending one plate-shaped member. However, the configuration of the present disclosure is not limited thereto, and if necessary, it is also possible to configure the side surface plate 58 and the lower plate 52 as independent components.

The lower plate 52 forms a bottom surface of the battery module 100. Accordingly, the lower plate 52 may be configured to be flat.

The side surface plate 58 may be formed to extend from both sides of the lower plate 52. A heat dissipation member or a buffer member may be interposed between the side surface plate 58 and the battery cell stack 1.

The first plate 50 may be made of a material having high thermal conductivity, such as metal. For example, the first plate 50 may be made of an aluminum material. However, the present disclosure is not limited thereto, and various materials may be used as long as it is a material having similar strength and thermal conductivity even if it is not metal.

The second plate 40 may be disposed above the battery cell 10 and coupled to an upper surface of the battery cell stack 1. In addition, the second plate 40 may be fastened to an upper end of the side surface plate 58 of the first plate 50. Therefore, when the second plate 40 is fastened to the first plate 50, the second plate 40 and the first plate 50 may have a shape of a hollow tubular member.

Like the first plate 50, the second plate 40 may be made of a material having high thermal conductivity, such as metal. For example, the second plate 40 may be made of an aluminum material. However, the present disclosure is not limited thereto, and various materials may be used as long as it is a material having similar strength and thermal conductivity even if it is not a metal.

The first plate 50 and the second plate 40 may be coupled by welding, or the like. However, the present disclosure is not limited thereto, and various modifications such as coupling in a sliding manner or coupling using fixing members such as bolts or screws are possible.

A heat transfer member 90 may be disposed in at least one of between the battery cell stack 1 and the first plate 50 and between the battery cell stack 1 and the second plate 40.

The heat transfer member 90 transfers heat generated from the battery cell 10 to the module case 30. To this end, the heat transfer member 90 may be made of a material having high thermal conductivity. For example, the heat transfer member 90 may be formed of any one of thermal grease, a thermal adhesive, an epoxy resin, and a heat dissipation pad, but is not limited thereto.

The heat transfer member 90 may be disposed on an inner surface of the module case 30 in a form of a pad, or may be formed by coating the inner surface of the module case 30 in a liquid or gel state. The heat transfer member 90 of the present embodiment has high insulation, for example, a material having a dielectric strength in a range of 10 to 30 KV/mm may be used.

Accordingly, in the battery module 100 according to the present embodiment, even if insulation is partially broken in the battery cell 10, insulation between the battery cell 10 and the module case by the heat transfer member 90 disposed around the battery cell 10 can be maintained.

The side surface cover 60 is coupled to both side surfaces of the battery cells 10 on which the electrode leads 15 are disposed, respectively.

The side surface cover 60 is coupled to the first plate 50 and the second plate 40, thereby completing an external appearance of the battery module 100 together with the first plate 50 and the second plate 40.

The side surface cover 60 may be formed of an insulating material such as a resin, and may include a through-hole 62 for exposing the connection terminal 72 externally.

The side surface cover 60 may be coupled to the first plate 50 and the second plate 40 through fixing members such as screws or bolts. However, the present disclosure is not limited thereto.

A bus bar assembly 70 may be disposed between the side surface cover 60 and the battery cells 10.

Figure 3:
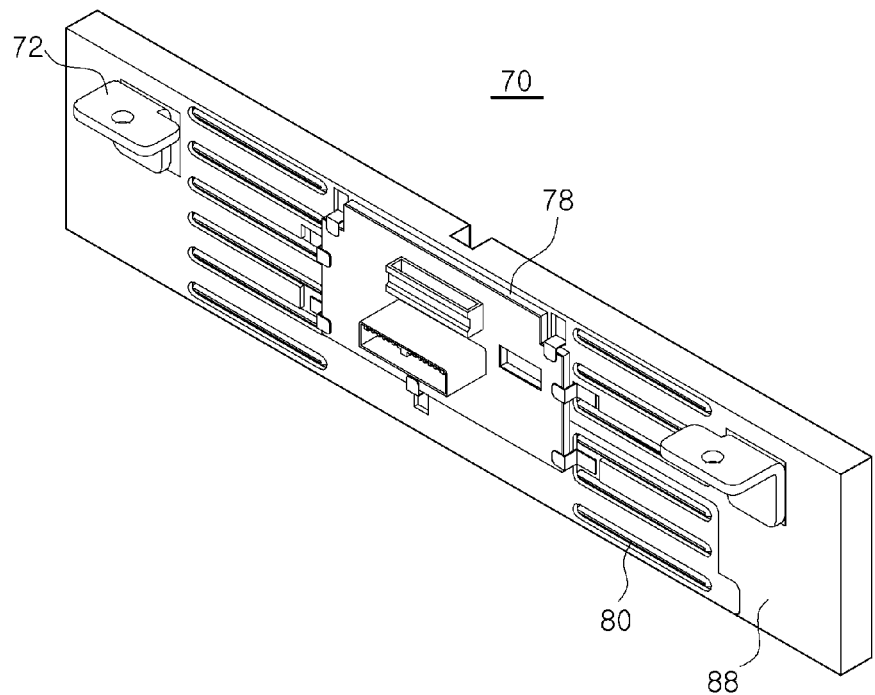
FIG. 3 is an enlarged perspective view of the bus bar assembly shown in FIG. 2.
Figure 4:
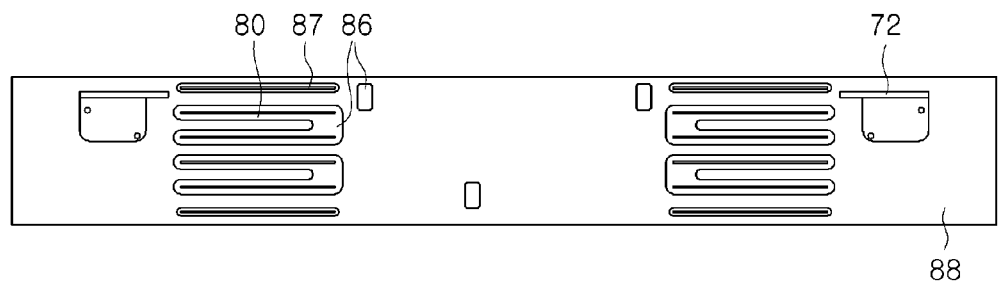
FIG. 4 is a front view of the busbar assembly shown in FIG. 3.
Figure 5:
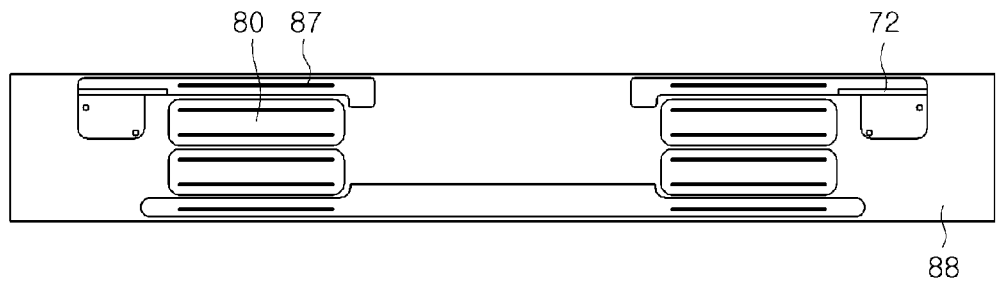
FIG. 5 is a view illustrating the thermal conduction unit partially omitted from the bus bar assembly shown in FIG. 3.

FIG. 3 is an enlarged perspective view of the bus bar assembly shown in FIG. 2. In addition, FIG. 4 is a front view of the bus bar assembly shown in FIG. 3, and FIG. 5 is a view illustrating the bus bar assembly shown in FIG. 3, partially omitting a thermal conduction unit. Here, in FIGS. 4 and 5, a circuit portion is omitted and illustrated for convenience of understanding.

Referring to FIGS. 3 to 5 together, a bus bar assembly 70 may be disposed on a side surface where electrode leads 15 of battery cells 10 are disposed and may be coupled to a battery cell stack 1, and may include at least one bus bar 80 and a thermal conduction unit 88.

The bus bar 80 may be formed in a form of a metal plate to be coupled to an electrode lead 15 of a battery cell 10. Therefore, the battery cells 10 may be electrically connected to each other through a bus bar, and may be electrically connected externally through a connection terminal 72 connected to the bus bar 80.

The bus bar 80 of the present embodiment may include a plurality of through slits 87 into which the electrode leads 15 of the battery cell 10 are inserted. Therefore, the electrode leads 15 can be bonded to the bus bar 80 through welding, or the like after being inserted into the through slit 87 of the bus bar 80, and an end of the electrode lead 15 may completely penetrate the bus bar 80 to protrude to an outside of the bus bar 80.

The bus bar assembly 70 may be provided with a connection terminal 72. The electrode lead 15 of the battery cell 10 may be electrically connected to the connection terminal 72 via the bus bar 80 provided in the bus bar assembly 70.

The connection terminal 72 is made of a conductive member and is connected to at least one bus bar 80 or is bonded to the bus bar 80 to electrically connect the battery cells 10 externally. For example, the connection terminal 72 may be integrally formed with the bus bar 80.

The connection terminal 72 may be exposed to the outside of the module case 30 through a through hole 62 formed in a side cover 60. Accordingly, the through-hole 62 of the side cover 60 may be formed in a form of a hole corresponding to the size and shape of the connection terminal 72.

The thermal conduction unit 88 is coupled to the bus bar 80 to form an overall external shape of the bus bar assembly 70.

The thermal conduction unit 88 may be formed of an insulating material, and at least a part of the bus bar 80 may be embedded in the thermal conduction unit 88.

For example, the bus bar 80 may be integrally formed with the thermal conduction unit 88 through an insert injection method.

In addition, the thermal conduction unit 88 of the present embodiment may be formed of a thermally conductive resin having high thermal conductivity. For example, the thermal conduction unit 88 may be formed of a resin containing a thermally conductive filler.

The thermally conductive filler may be a ceramic-based filler, for example, may include at least one selected from a group consisting of boron nitride, aluminum nitride, silicon carbide, magnesium oxide, and aluminum oxide.

In addition, the resin material itself may be a resin component or may include a precursor of the resin component, that is, a component that can become a resin component through a reaction such as a curing reaction or a polymerization reaction.

Meanwhile, in the present embodiment, the bus bar 80 is basically configured to dissipate heat through the thermal conduction unit 88. Therefore, when the thermal conductivity of the thermal conduction unit 88 is low, it is difficult to smoothly dissipate the heat of the bus bar 80.

The present applicant confirmed through various experiments that when the thermal conductivity of the thermal conduction unit 88 is less than 2 W/mK, the heat of the bus bar 80 is not effectively transferred to the module case 30. Accordingly, the thermal conduction unit 88 of the present embodiment may be formed to have thermal conductivity of 2 W/mK or more.

In addition, in order to prevent insulation breakdown, the thermal conduction unit 88 of this embodiment may have volume resistivity of $1 \times 10^{10}$ Ω·cm or more, and surface resistance of $1 \times 10^{12}$ Ω·cm or more, in an environment of 500 V voltage and 60 seconds.

In the bus bar assembly 70 configured as described above, at least half of the bus bar 80 may be embedded in the thermal conduction unit 88. In this embodiment, only the through slit 87 and the periphery of the bus bar 80 are partially exposed to the outside of the thermal conduction unit 88, and the remaining portion of the bus bar 80 is all embedded in the thermal conduction unit 88. Accordingly, heat can be transferred from the entire bus bar 80 to the thermal conduction unit 88, thereby enhancing a heat dissipation effect.

In addition, in the bus bar 80, a bonding region 86 to which a circuit portion 78 to be described later is bonded may also be exposed to the outside of the thermal conduction unit 88 if necessary. However, the present disclosure is not limited thereto.

The bus bar assembly 70 may be coupled to the module case 30 such that at least a portion thereof contacts the module case 30.

Figure 6:
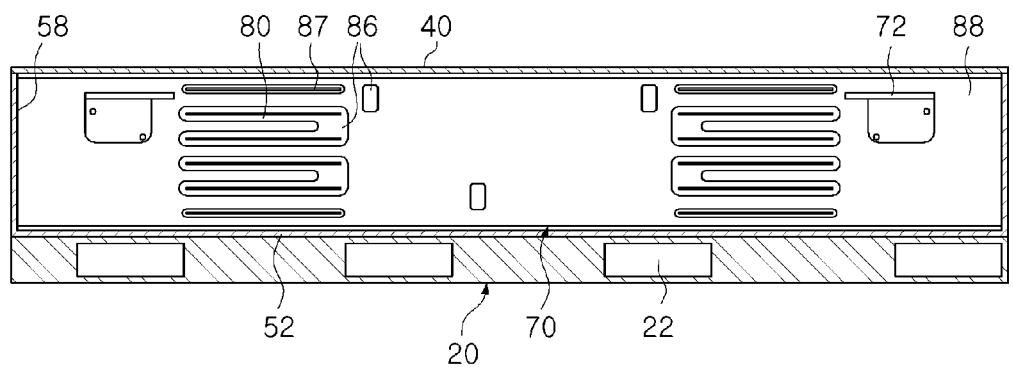
FIG. 6 is a side view of the battery module shown in FIG. 1.

FIG. 6 is a side view of the battery module shown in FIG. 1, omitting and illustrating a side cover and a circuit portion.

As shown in FIG. 6, in the present embodiment, a bus bar assembly 70 is configured such that both side edges thereof are in contact with a side plate 58 of a module case 30. Accordingly, heat transferred from the bus bar assembly 70 may be diffused to the entire module case 30 through the side plate 58, and the heat may be dissipated through the cooling device 20 coupled to the module case 30.

To this end, a thermal interface material (TIM) or a thermally conductive adhesive may be disposed on a contact surface between the bus bar assembly and the side plate.

In the battery module 100 of the present embodiment, heat from the busbar assembly 70 is transferred to a lower plate 52 via the side plate 58. However, the present disclosure is not limited thereto, and it is also possible to configure the bus bar assembly 70 to be in contact with the lower plate 52 so that heat is directly transferred to the lower plate 52.

However, when a cooling device 20 is provided on an outer surface of the lower plate 52 as in the present embodiment, a heat transfer path from the bus bar 80 to the cooling device 20 becomes very short, so the bus bar assembly 70 may be partially overcooled, or temperature deviation of the bus bar assembly 70 may become excessively large.

Accordingly, the battery module 100 of the present embodiment is configured such that the bus bar assembly 70 is in contact with the side plate 58 of the module case 30 in the widest area. Accordingly, since most of the heat of the busbar assembly 70 is transferred to the cooling device 20 through the side plate 58, it is possible to minimize partial overcooling of the busbar assembly 70 or an increase in temperature deviation.

However, the configuration of the present disclosure is not limited thereto, and when the position of the cooling device 20 is changed or the cooling device 20 is added, the contact position or contact area between the bus bar assembly 70 and the module case 30 may be changed.

The busbar assembly 70 may include a circuit portion 78. The circuit portion may include a circuit board and a plurality of electronic components mounted on the circuit board, and may perform a function of sensing a voltage of the battery cell 10 therethrough.

As shown in FIG. 3, the circuit portion 78 may be bonded to a bonding region 86 of a bus bar 80 exposed to an outside of the thermal conduction unit 88 to be electrically connected to the bus bar 80. However, the configuration of the present disclosure is not limited thereto, and the circuit portion 78 may be disposed in various positions as long as it can be electrically connected to the battery cells.

A cooling device 20 may be coupled to an outer surface of a module case 30 to effectively cool the module case 30. In the present embodiment, the cooling device 20 may be coupled to an outer surface of a lower plate 52 to directly cool the lower plate 52. However, the configuration of the present disclosure is not limited thereto. For example, the cooling device may be additionally or optionally disposed on an outer surface of a side plate 58 or a second plate 40.

The cooling device 20 of the present embodiment may be a water cooling-type cooling device 20 having a cooling passage 22 therein. However, the configuration of the present disclosure is not limited thereto, and it is also possible to apply an air-cooled cooling device.

The cooling device 20 may be integrally coupled to the module case 30 to be included in the battery module 100. However, the present disclosure is not limited thereto, and may also be provided in a device on which the battery module is mounted separately from the battery module.

In addition, for effective heat transfer, a heat transfer member may be additionally disposed between the module case 30 and the cooling device 20.

In the battery module 100 configured as described above, heat transferred from the battery cell 10 to the bus bar 80 is quickly transferred to the module case 30 through the thermal conduction unit 88. Accordingly, even if the heat generated from the battery cell 10 is concentrated on the bus bar 80, the heat of the bus bar 80 can be effectively dissipated.

In addition, since most of the bus bar 80 is embedded inside the thermal conduction unit 88 having electrical insulation properties, exposure of the bus bar 80 can be minimized, and thus the bus bar 80 and other components (e.g., a module case) or the like) can improve insulation reliability.

As set forth above, according to an embodiment of the present disclosure, in a battery module, heat transferred from a battery cell to a bus bar is quickly transferred to a case through a heat transfer unit.

Therefore, even if heat generated from the battery cell is concentrated on the bus bar, heat of the bus bar may be effectively discharged.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

While example embodiments have been shown and described above, it will be apparent to those skilled in the art that modifications and variations could be made without departing from the scope of the present inventive concept as defined by the appended claims.

What is claimed is:

1. A battery module, comprising:
a battery cell stack in which a plurality of battery cells are stacked;
a module case for accommodating the battery cell stack therein; and
a bus bar assembly disposed between the module case and the battery cell stack and electrically connected to the battery cells,
wherein the bus bar assembly comprises at least one bus bar having a plurality of through slits to which electrode leads of the battery cells are coupled, and
a thermal conduction unit for covering the at least one bus bar therein,
wherein the through slit and a periphery of the through slit are exposed to the outside of the thermal conduction unit, and the remaining portion of the at least one bus bar is covered in the thermal conduction unit, and
wherein the thermal conduction unit is formed of a resin material containing a thermally conductive filler.

2. The battery module of claim 1, wherein the bus bar assembly is disposed such that at least a portion thereof is in contact with the module case.

3. The battery module of claim 1, wherein the thermally conductive filler comprises at least one selected from a group consisting of boron nitride, aluminum nitride, silicon carbide, magnesium oxide, and aluminum oxide.

4. The battery module of claim 1, wherein the thermal conduction unit is formed of a material having thermal conductivity of 2 W/mK or more.

5. The battery module of claim 1, wherein the thermal conduction unit is formed of a material having volume resistivity of $1\times10^{10}$ Ω·cm or more, in an environment of 500V voltage and 60 seconds.

6. The battery module of claim 1, wherein the thermal conduction unit is formed of a material having surface resistance of $1\times10^{12}$ Ω·cm or more, in an environment of 500V voltage and 60 seconds.

7. The battery module of claim 1, wherein the bus bar assembly is configured such that at least half of the at least one bus bar is covered in the thermal conduction unit.

8. The battery module of claim 1, further comprising a cooling device coupled to an external surface of the case.

9. The battery module of claim 8, wherein the cooling device has a cooling passage therein.

* * * * *